TRANSISTOR AND METHOD OF MAKING A TRANSISTOR

Filed Sept. 20, 1956 2 Sheets-Sheet 1

INVENTORS

BERNARD OSTROFSKY
JAMES W. BALLARD

By Toulmin & Toulmin

Attorneys

TRANSISTOR AND METHOD OF MAKING A TRANSISTOR

Filed Sept. 20, 1956 2 Sheets-Sheet 2

INVENTORS
BERNARD OSTROFSKY
JAMES W. BALLARD

By Toulmin & Toulmin
Attorneys

United States Patent Office 2,913,357

Patented Nov. 17, 1959

2,913,357

TRANSISTOR AND METHOD OF MAKING A TRANSISTOR

Bernard Ostrofsky, Crown Point, Ind., and James W. Ballard, Miamisburg, Ohio, assignors, by mesne assignments, to Union Carbide Corporation, New York, N.Y., a corporation of New York Application September 20, 1956, Serial No. 610,999

2 Claims. (Cl. 117—200)

This invention relates to the production of electrically resistant films and to apparatus and methods for attaining the same. More particularly the invention relates to the production of electrically resistant elements by the thermal decomposition of chromium hexacarbonyl from the vapor state to produce chromium containing deposits of a low temperature coefficient of resistance upon ceramic insulating material.

This application is a continuation-in-part of our copending application Serial No. 398,000, filed December 14, 1953, now Patent No. 2,790,731.

A primary object of the invention is the provision of a novel method of gas plating ceramic bases.

An important object of the invention is the provision of novel apparatus useful in carrying out the methods of invention.

Another object of the invention is to provide a method for making resistors and semi-electrical conductors such as transistors and wherein the various constituents are deposited by gas plating.

Another and a principal object of the invention is the provision on ceramic bases of novel electrically resistant films of a substantially zero temperature coefficient of resistance.

These and other allied objects of the invention are attained by thermally decomposing chromium hexacarbonyl vapors by contact thereof with a heated ceramic base, the chromium hexacarbonyl atmosphere being substantially static, at low pressure and preferably surrounded by a heated fluid which maintains the hexacarbonyl vapors at a temperature which is above the volatilization temperature of the carbonyl.

In the practice of this invention a substantially pure chromium hexacarbonyl is employed. This carbonyl is 99 percent volatilizable, only about 1 percent of the weight of the material forming a residue. The carbonyl is attained by purifying hexacarbonyl samples, such as the commercial variety, by subliming the same at about 100° C. and collecting the volatilized vapors on a cold, clean surface. The collected samples will be found to be particularly useful in this invention in the attainment of the temperature ranges stated.

The invention will be more fully understood by reference to the following detailed description and accompanying drawings wherein.

Figure 1:
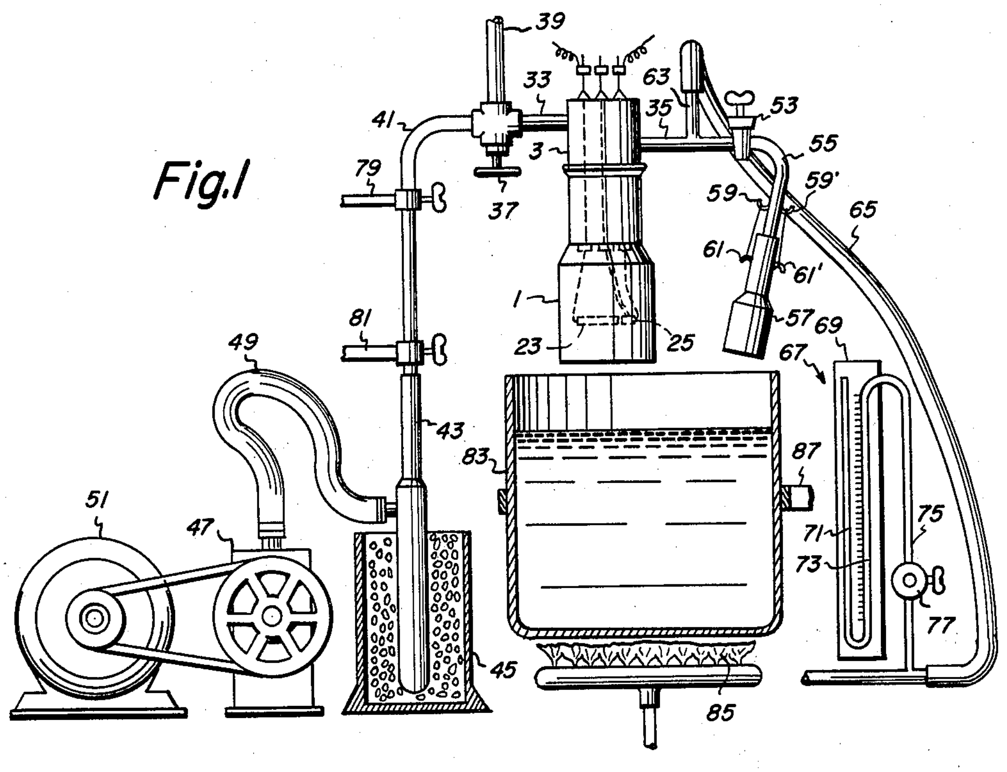
Figure 1 is a view illustrating apparatus useful in the practice of the invention.

Referring to the drawings there is shown in Figure 1 a plating chamber in the form of a glass vessel 1 having a glass closure member 3 removably sealed into the mouth thereof. The sealing is effected by provision of ground glass surfaces on the vessel and closure member, this type of sealing being most effective with chromium hexacarbonyl vapors.

Closure member 3 is hollow, closed at its upper end and extends well above the mouth of the vessel 1. On the top of the closure member the same is provided with six glass protuberances each of which has sealed therethrough a tungsten electrode. These electrodes are conveniently provided in pairs indicated respectively at 5, 7; 9, 11; and 13, 15.

For purposes hereinafter described the electrodes 13, 15 may be considered as spares utilizable to take any desired measurement and not necessary to the practice of the invention. The electrodes themselves extend well down into the vessel 1 and the lower end of each is provided with an electrically conductive collar of brass having an aperture through which the electrode passes vertically; each collar also is provided with a threaded passage in which a set screw is engaged in contact with the electrode to securely hold the collar in position on the electrode.

A second threaded passage is provided in each collar for the passing of a second set screw which communicates with a second aperture in which electrical leads are secured by the set screws. These collars will be referred to more particularly hereinafter.

Collars 17, 19 on the upper ends of the electrodes 9, 11 are connected to a 6.3 source of A.C. voltage; at the lower ends of these electrodes a coil of nichrome wire 21 is connected to the electrodes by set screws on collars 20, 22 respectively. This coil is adapted to receive thereover a tubular ceramic member 23 having a length of about 1 inch and a diameter of 7/16 inch which is to be plated with the film deposited from the vapors of the chromium hexacarbonyl. A second and smaller tubular ceramic piece 25 is retained on the coil 21 in adjacent relationship to the member 23. Secured against the piece 25 is the hot juncture 27 of a Chromel-Alumel thermal couple the cold ends of which are respectively connected to collars 29, 31 on electrodes 5, 7, the leads being retained by set screws threaded into the collar.

The upper ends of electrodes 5, 7 have connected thereto a milli-volt meter (not shown) and the voltage developed between electrodes 5,7 is accordingly a measure of the temperature at the ceramic material 25 and also 27 which is closely adjacent to the member 23. Such equipment for temperature measure is not described in further detail herein since the practice and equipment involved are well known standard industrial procedure.

The closure member 3 above the mouth of the vessel 1 is also provided on opposed sides thereof with tubular laterally extending arms 33, 35 which communicate with the hollow interior of the member 3 and accordingly with the interior of the vessel 1 (Figure 1).

Arm 33 is provided with a three-way (glass) valve 37 which permits of connecting the arm and accordingly the vessel 1 with the atmosphere through the conduit 39; the arm 33 may also be connected through valve 37 with arm extension 41, the lower end of which is provided with a ground glass surface secured to an upper ground glass surface of conduit 43; or valve 37 may be closed to seal off the arm 33 and the vessel 1 from the atmosphere and conduit 43 at the same time.

Conduit 43 has the lower end thereof closed to define a receiver contained in a trap, which trap comprises a casing 45. Casing 45 and the receiver have therebetween a cooling medium, preferably a mixture of Dry Ice and acetone, and the trap functions to effectively condense and retain vapors passing through the conduit 43.

Conduit 43 above the trap is connected to a pump 47 through line 49, the pump when driven by motor 51 being effective to create a vacuum pressure to occasion the control of gases through conduit 43 and arm extension 41 from the vessel 1.

Extending rightwardly from the closure member 3 as shown in Figure 1 arm 35 is provided with a valve 53 and the lower end of arm extension 55 has a ground glass surface which is securable with the upper ground glass surface of a container 57.

In order to securely and removably position container 57 on the arm extension 55 projections indicated at 59, 59' are provided on arm 55 and projections 61, 61' are provided on container 57, and rubber bands may be extended between arms to securely and removably retain the container in association with the arm extension.

Container 57 is provided in the base thereof with a supply of substantially pure chromium hexacarbonyl in solid form. In actual practice it has been found that chromium hexacarbonyl which leaves a solid residue of approximately one percent by weight is entirely suitable for the practice of the invention. The carbonyl when heated to about 100° C. volatilizes readily and when the vaporized material is brought into contact with a surface heated to a temperature in the range of 125° to 200° C. the composition decomposes to produce a metallic deposit.

Conduit 63 of glass is positioned between closure member 3 and valve 53 and is connected by suitable means such as rubber hosing 65 to a manometer indicated generally at 67. This manometer is of standard construction, provided with mercury and is adapted to indicate low pressures, and it is not considered necessary to specifically describe the manometer in detail since the same is merely an indicating instrument in the process of invention and the procedures of employing the same are well known, but it may be noted for the sake of clarity that the manometer tubings are mounted on a board 69, the longer mercury column being contained in the left tubing 71 (Figure 1), the shorter column being in tubing 73 which is connected to tube 75 provided with valve 77; the horizontal tubing connected to valve 77 is closable at the left hand end (Figure 1). Gas pressure exerted through conduit 65 accordingly passes through column 75 to alter the height of the column of the manometer when valve 77 is open. Normally in the practice of the invention valve 77 is maintained open at all times.

Brackets, portions of which are indicated at 79, 81 suitably and adjustably support the vessel 1 and conduit 43. Positioned below the vessel 1 and the container 57 is a receptacle 83 which is adapted as a water bath and which may be heated by gas flame indicated at 85, the water, in the practice of the invention, being brought to practically 100° C., that is the boiling point. The bath is suitably supported by bracket 87 and may be raised or lowered to immerse the vessel 1 and the closure member 3 in such manner that the arms 33, 35 and the vessel 57 are completely within the bath.

In the practice of the invention, the apparatus is connected as shown in Figure 1, with valve 37 open to the conduit 43 and valve 53 open to the container 57, the ceramic workpiece 23 being supported on the Nichrome wire 21. In this condition the vacuum pump is operated to completely clear the system of air. At the same time the 6.3 volt A.C. source is connected across the electrodes 9, 11 to supply thereto a current which heats the coil element 21 and thereby also heating the ceramic member 23 and the ceramic piece 25. This heating takes place preferably as the evacuation occurs in order that any occluded gases included in the ceramic material may be expelled from the system. The ceramic materials themselves are cleaned prior to their introduction into the vessel 1 the cleaning being effected in any suitable manner known to the art as with alcohol.

When the apparatus has been substantially completely exhausted of gases the valve 53 is closed and the vessel 1 and container 57 are lowered into the water bath to such an extent that the arms 33 and 55 are substantially completely covered by the water, which has in the meanwhile been heated to about 100° C. Valve 37 is at this time open to conduit 43 and the motor and pump continue to operate and accordingly any further material which may be contained, for example, in the vessel 1 is expelled by the heating. Also the heated water occasions a development of a high vapor pressure in the container 57 and the arm extension 55, but the gases cannot pass the tightly fitting glass valve 53.

When the temperature of the ceramic pieces 23, 25 as indicated by the thermocouple positioned at 27 have reached a temperature of approximately 150° C., valve 53 is opened to admit to the vessel 1 and the hollow closure member 3 vapors of chromium hexacarbonyl. Prior to opening valve 53 valve 37 is closed to shut off arm 33 from the atmosphere and the arm extension 41, The conduit 63, however, is open and some very slight condensation of chromium hexacarbonyl may appear on the glass wall of this conduit; this is not however of serious effect.

When the pressure within the vessel 1 and closure member 3 has reached a point of one-half centimeter of mercury valve 53 is closed to prevent further ingress of carbonyl to the vessel 1. Then with the substantially static atmosphere of carbonyl in the vessel the same is maintained in the water bath for a period of five minutes. During the course of this period the carbonyl decomposes depositing a film over the ceramic member 23 which due to its suspended condition and the uniform heating of the closely wound coil 21 is uniformly coated with the deposit. The deposition which also takes place to some extent upon the piece 25 is not deleterious to the temperature measurement.

In this connection it is to be noted that the prime requisite is that the temperature of the ceramic pieces be brought to a temperature within the range of 125–200° C. prior to the introduction of the carbonyl and that the heating be continued at substantially the same rate during the deposition. As the carbonyl decomposes the pressure as indicated by the manometer 67 will be observed to increase slightly as gaseous products of the decomposition, such as Co, are formed.

Figures 4, 5:
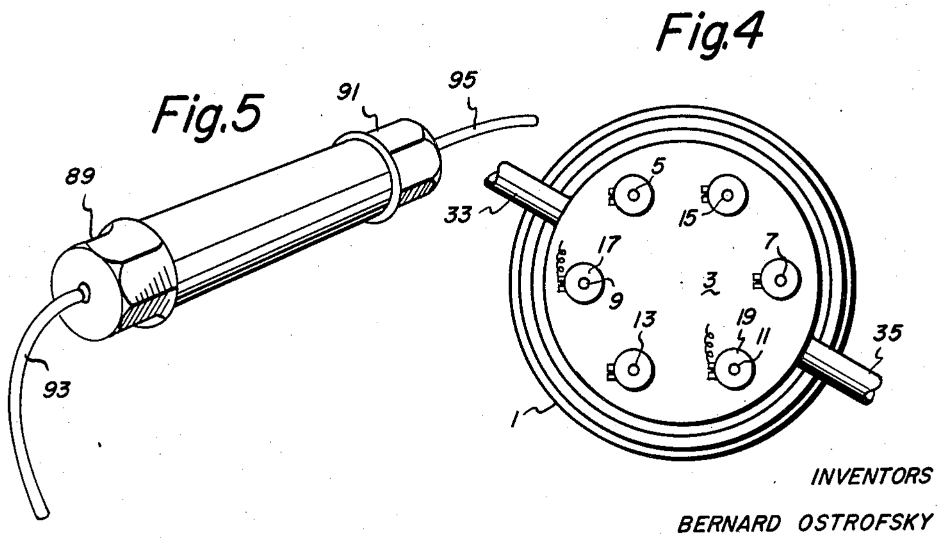
Figure 4 is a plan view of a portion of the apparatus of Figure 1.
Figure 5 illustrates a completed resistant element having terminal bands and leads fitted thereto.
Figures 2, 3:
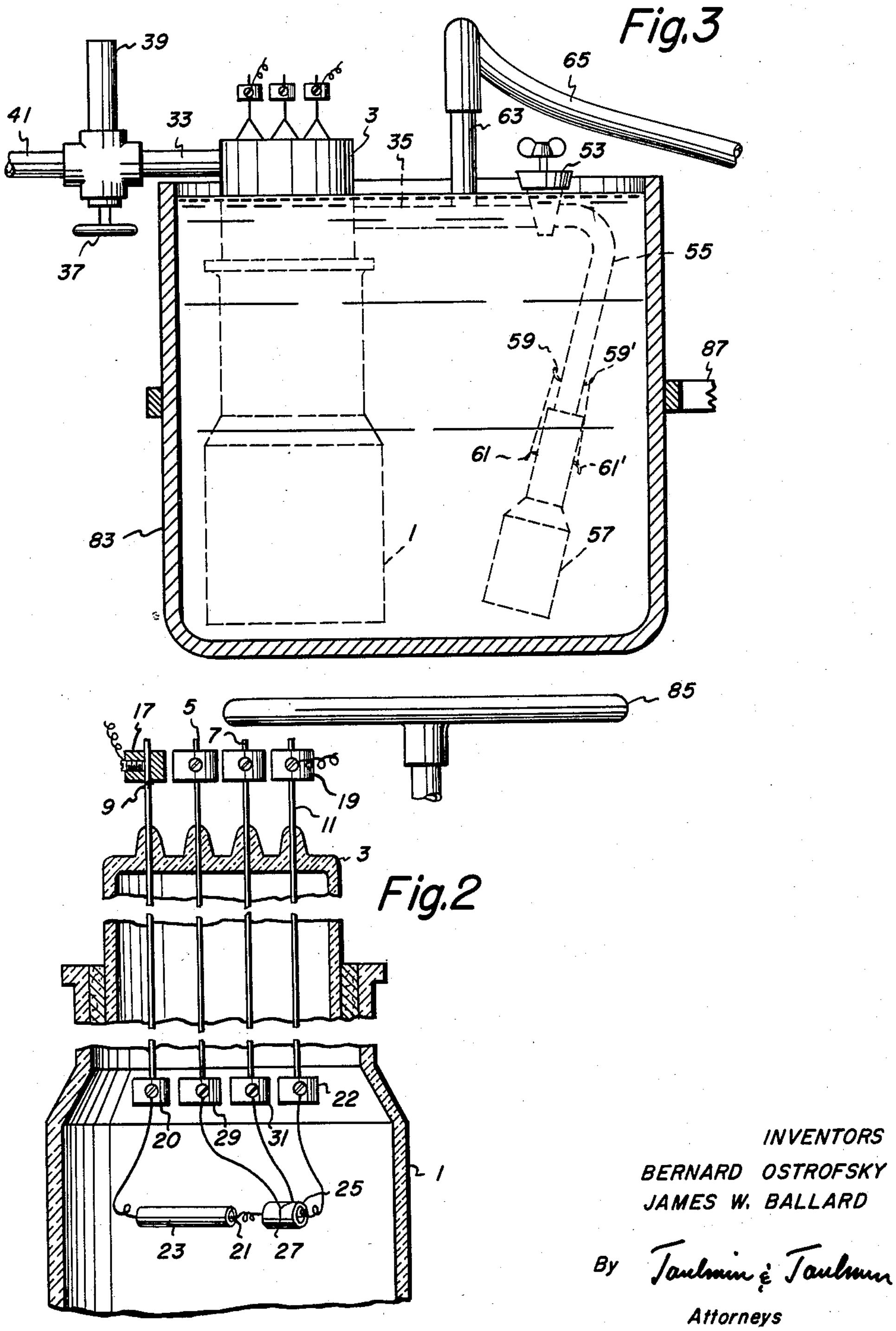
Figure 2 is a view of a portion of the apparatus of Figure 1.
Figure 3 is another view of a portion of the apparatus of Figure 1.

At the termination of five minutes in the above specific example, the valve 37 was opened to connect the arm 33 to the pumping apparatus and the same was evacuated of substantially all gases. The vessel 1 and container 57 are removed from the water bath and valve 37 was operated to connect conduit 39 and the atmosphere with the arm 33 and the vessel 1. The closure member 3 and the ceramic piece suspended from the electrodes were then removed from the vessel. Upon removal and cooling to room temperature the coated ceramic tubular member 23 is provided, as shown in Figure 5, with silver terminal caps 89 and 91 having axial terminal leads 93 and 95, respectively, substantially negligible contact resistance is thus achieved.

The resistance of the ceramic tubular base member, which has a length of about 1 inch and an outside diameter of about 7/16 of an inch, was found to be about 140.6 ohms at room temperature or 27.7° C.

The same procedure described above was then repeated with a new ceramic member, with the exception that valve 53 was closed off when the manometer indicated a pressure of 2 centimeters of mercury in vessel 1. The resistors produced at 27.7° C. had a value of 5.31 ohms.

Resistors produced under varying conditions of time were checked for the effect of higher temperature on resistance characteristics. This was done by placing the resistors in an oven, the resistors having leads of suitable length soldered thereto to permit extension of the leads through a small opening in the oven.

The method employed is standard practice and need not be discussed in detail, but it should be noted that each resistor was held at a given elevated temperature for one hour before measuring the resistance. By way of example, the resistance which measured 5.31 ohms at 27.7° C. had a value of 5.33 ohms at 65° C., and a value of 5.35 ohms at 105° C. Upon cooling again to 28.9° C. the resistance exhibited a value of 5.31 ohms again, indicating a high degree of stability in the resistance of the deposited coating.

Similar tests were made with the same resistors at temperatures below the freezing point and the resistance of the coating at minus 15° C. was found to be 5.33 ohms, and at minus 55° C. the resistance was 5.26 ohms. Upon return to a temperature of 22° C. the resistance was found to be 5.33—further illustrating high stability in the coating.

The average temperature coefficient of resistance was then found by determining the temperature coefficient of resistance at each temperature with respect to room temperature and then averaging the coefficients for each of the above specifically set forth temperatures.

Similar data was prepared for a variety of resistors produced by varying the time and the pressure conditions in vessel 1 and the following data was secured for a series of resistors:

| Resistor | Resistance (Ohms) | Av. Temperature Coef. of Resistance, Percent/° C. (−55° C. to 105° C.) |
|---|---|---|
| A | 5.31 | +0.01 |
| B | 4.58 | +0.004 |
| C | 26.5 | +0.004 |
| D | 35.2 | +0.003 |
| E | 47.5 | +0.01 |
| F | 56.5 | +0.008 |
| G | 68.7 | +0.01 |
| H | 140.6 | −0.06 |

It is to be noted that the resistors which exhibit the above characteristics of low temperature coefficient of resistance over a relatively wide temperature range are a dull gray or gray black in color and thus are not the shiny mirror surfaces which are frequently characteristic of gas plated articles.

In the making of semi-conductors, for example transistors, the metal constituents may be deposited on the ceramic substrate by gas plating utilizing a suitable gaseous metal bearing compound of the element to be deposited.

The depth of coating is controllable by controlling the time of exposure of the ceramic base to the hexacarbonyl atmosphere; a longer time gives a greater coating depth as long as sufficient carbonyl is present to deposit. Control is also effected by control of the hexacarbonyl pressure in vessel 1 and increased pressure contributes to an increased depth and vice versa. Increasing the temperature increases the rate of plating and accordingly the depth attainable in a given time. Time, temperature and pressure are accordingly correlative factors, each of which may be varied to permit the attainment of particular resistance values.

The carbonyl pressure attained upon opening of valve 53 should be low and generally it has been found that pressure of ½ centimeter to 2 centimeters of mercury are very effective, although pressures outside of this range are useful under particular time and temperature conditions.

The temperature of the ceramic material preferably is between 125 and 200° C.; below 120° C. very little plating occurs and above 200° C., that is at about 205° C., the plating tends to become non-uniform, resulting in poorer products. The optimum temperature is about 150° C. in the method described.

The ceramic pieces may be masked to provide particular patterns on the resistors, as for example, a spiral formation if desired. Further the films may be mechanically cut to effect control over the resistance value of a resistor. Such processes generally are known.

The films deposited on the ceramic base are bonded well and permanent. The value of the temperature coefficient of resistance is as noted about 0.01 percent/° C. and for many applications the temperature coefficient may be considered to be substantially zero.

In the use of the invention to make resistors and semi-electrical conductors, as aforementioned, the workpiece 23 may comprise a semi-conductive element, such as a wafer of germanium (N-type) or silicon and having a metal acceptor deposited thereon. The semi-conductive element is heated to approximately 175° C. and while thus heated exposed to an atmosphere of chromium hexacarbonyl causing the same to decompose and deposit chromium on the semi-conductive element. Deposition of the acceptor metal is suitably controlled so that only the desired surface portion of the element is plated, the surface not to be plated being masked as heretofore mentioned. In place of employing a chromium bearing compound for gas plating other metal bearing compounds may be used, e.g., aluminum triethyl or the like heat decomposable organo-metal compound. Other metals, such as nickel, molybdenum, titanium, tungsten, tantalum and the like may be employed in the form of their carbonyls to deposit the respective metals.

It will be understood that this invention is susceptible to modification in order to adopt it to different usages and conditions and accordingly, it is desired to comprehend such modifications within this invention as may fall within the scope of the appended claims.

What is claimed is:

1. In the method of making an electrical transistor comprising a semi-conductor of the N-type silicon body, the improvement which consists in heating said silicon body and while thus heated contacting the same with chromium carbonyl, the temperature of said silicon body being maintained sufficiently high to cause said chromium carbonyl to decompose and substantially pure chromium metal deposited as a continuous and uniform film of metal on the surface of said silicon body to provide a composite silicon-chromium metal body.

2. As an article of manufacture, an electrical transistor made in accordance with the process of claim 1.

References Cited in the file of this patent

UNITED STATES PATENTS

| | | |
|---|---|---|
| 2,183,302 | Brauer | Dec. 12, 1939 |
| 2,440,691 | Jira | May 4, 1948 |
| 2,556,711 | Teal | June 12, 1951 |
| 2,602,033 | Lander | July 1, 1952 |
| 2,634,322 | Law | Apr. 7, 1953 |
| 2,669,663 | Pantchecknikoff | Feb. 16, 1954 |
| 2,671,735 | Grisdale et al. | Mar. 9, 1954 |
| 2,690,980 | Lander | Oct. 5, 1954 |
| 2,695,852 | Sparks | Nov. 30, 1954 |
| 2,729,190 | Pawlyk | Jan. 3, 1956 |
| 2,745,046 | Lark-Horovitz et al. | May 8, 1956 |